E. D. PUTT.
BEAD COVERING MACHINE.
APPLICATION FILED OCT. 31, 1917.
1,409,467.
Patented Mar. 14, 1922.
3 SHEETS—SHEET 1.
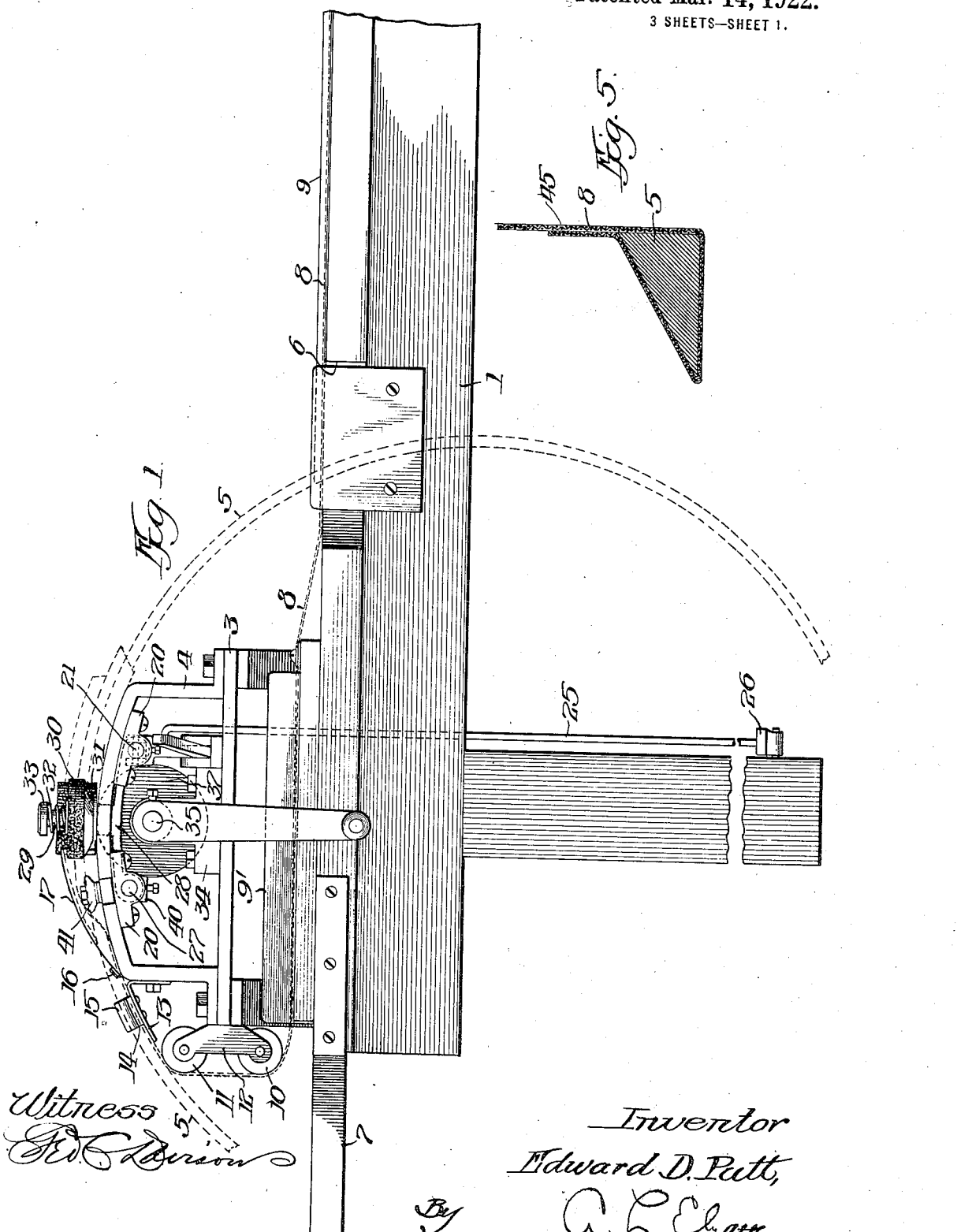
Inventor
Edward D. Putt,

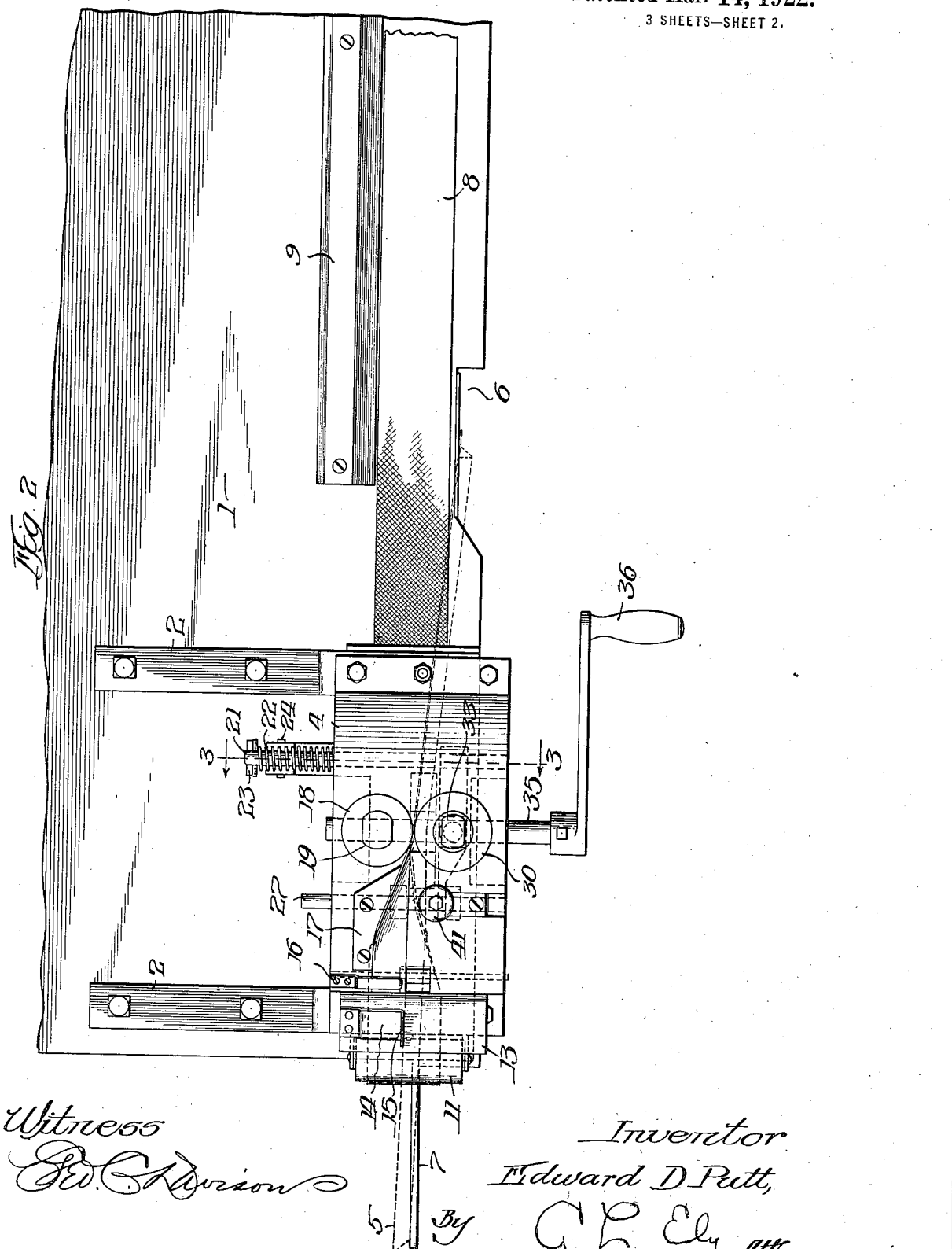

E. D. PUTT.
BEAD COVERING MACHINE.
APPLICATION FILED OCT. 31, 1917.
1,409,467.
Patented Mar. 14, 1922.
3 SHEETS—SHEET 3.
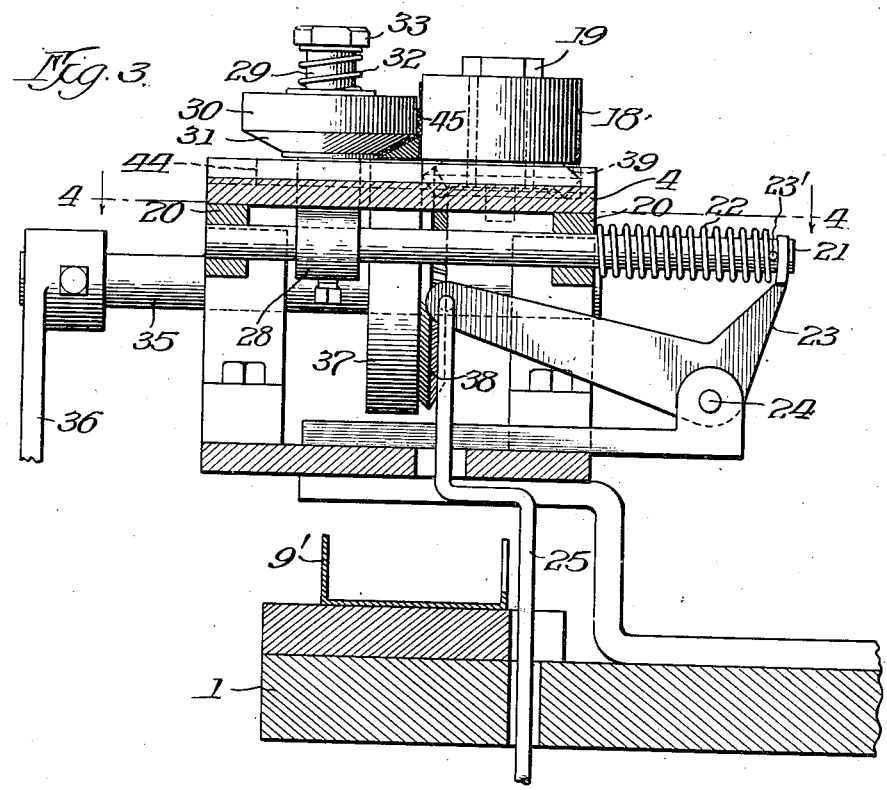
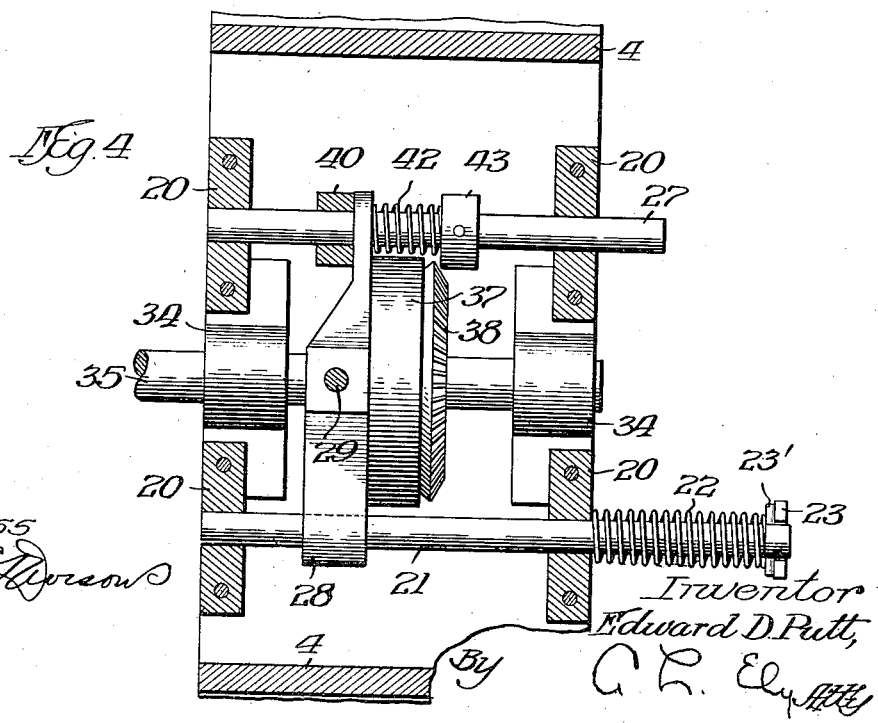

UNITED STATES PATENT OFFICE.

EDWARD D. PUTT, OF AKRON, OHIO, ASSIGNOR TO THE FIRESTONE TIRE & RUBBER COMPANY, OF AKRON, OHIO, A CORPORATION OF OHIO.

BEAD-COVERING MACHINE.

1,409,467. Specification of Letters Patent. Patented Mar. 14, 1922.

Application filed October 31, 1917. Serial No. 199,612.

*To all whom it may concern:*

Be it known that I, EDWARD D. PUTT, a citizen of the United States, and a resident of Akron, in the county of Summit and State of Ohio, have invented certain new and useful Improvements in Bead-Covering Machines, of which the following is a specification.

This invention relates to machines which are adapted to apply and roll a fabric covering on that portion of a tire closely adjacent to the rim, known as the bead. In the case of what is known as a straight-side tire the bead consists of a non-extensible ring, triangular in cross section. Before being incorporated into the tire casing it is required that the bead be covered by a strip of fabric, and in certain cases the fabric is made much wider than is necessary to cover the bead, so that at one corner of the bead there is an outwardly extending web which is adapted to be inserted between adjacent plies of the tire covering. This operation on a straight side, or circular bead, has, to the best of my knowledge, been done previously by hand.

In the drawings accompanying this specification I have shown one form of machine which I have constructed for carrying out the operation of covering the bead.

In these drawings:

Fig. 1 represents a side elevation of the machine showing a straight side bead mounted on the machine, the fabric being just started in the operation of covering the bead.

Fig. 2 is a plan.

Fig. 3 is a cross section on the line 3—3 of Fig. 2.

Fig. 4 is a horizontal section taken on the line 4—4 of Fig. 3, and

Fig. 5 is an enlarged cross section of the bead and its covering.

The machine comprises a base plate or table 1, at one corner of which are secured two parallel brackets 2 which support the plate 3 of the machine. To the upper surface of the plate 3 is secured an inverted U-shaped bead-carrier 4 which supports the bead while it is being covered, above the upper surface of which the various rolls are intended to operate.

The bead is designated as 5 and is placed over the arch-shaped support 4, table 1 being provided with a recess 6 into which one side of the bead may pass, and also an arm 7 extending from the table in the opposite direction from the recess 6. The bead is held in position by these two instrumentalities, resting on the plate 4. The cover, which is in the form of a long bias strip of fabric 8 is laid on the table 1 to the right of the brackets shown in Fig. 1. A guide plate 9 is provided against which the fabric may be laid. From the surface of the table the fabric passes into a gutter-shaped guide plate 9′ which is located on the table 1 under bead support 4, and which serves to accurately position the fabric under the bead. The fabric then passes upwardly over roller 10 and roller 11, which rollers are carried by a bracket 12 carried by the plate 3. The bead 5 rests on the roller 11 above the fabric. From the roller 11 the fabric and the bead pass over a downwardly extending shelf 13, to the rear side of which is secured a guide plate 14, spaced slightly above the shelf 13 and terminating in a foot or guide flange 15. As shown in Fig. 2 the fabric passes under the bracket 14 while the bead contacts the guide flange. The several rollers and shelf 13 serve to flatten the fabric and present it to the shaping and applying devices in proper condition to be folded.

After leaving the shaft 13 the fabric and the bead pass on to the surface of the bead support 4 and the first element encountered on the surface of this member is a finger 16, which projects over the rear edge of the fabric and prevents the same from being turned upwardly until the proper moment. Immediately adjacent to fingers 16 and in the rear of the arch member 4 is secured a guiding and turning shoe, or horn 17 which is formed with a gradually curved surface adapted to bend the fabric behind the bead into vertical position, delivering the fabric in this position, to a roller 18 mounted on a spindle 19 secured to the plate 4.

On the under side of the plate 4 are secured brackets 20, four in number, and arranged in pairs. In the right hand pair of brackets 20 is slidably mounted a horizontal rod 21 arranged to be moved in the brackets, against the force of a coil spring 22, by means of an angle lever 23 pivoted on the base of the machine, as at 24, and bearing against a cross pin 23′ on the rod. On one end of the lever 23 is pivoted a vertical arm 25 carrying an operating treadle 26. In the opposite pair of brackets 20 there is slidably mounted the second rod 27 parallel to the rod 21. A bridge piece 28 is secured to the rod 21 and extends over and loosely surrounds the rod 27. At a midway point on the bridge piece 28 is secured the vertical axis 29 of the covering roll 30 which roll is placed directly opposite and closely adjacent to the roller 18. A slot 44 is provided in the arched table 4, through which the axis 29 passes. The under side of the roller is formed on a bevel 31 so as to conform to the long side of the bead as it lies on the table. A coil spring 32 bears on the top of the roller 30, being held by a nut 33 on the upper end of the pin 29. The spring enables the roller 30 to move vertically slightly when a splice occurs in the fabric covering, and the spring 22 allows it to move horizontally under the same conditions. Directly below the axes of the rollers 18 and 30 there is mounted in two brackets 34 secured to the plate 9, a horizontal shaft 35, which extends to the front of the machine and carries an operating handle 36. Directly beneath the bevel portion 31 of the roller 30, the shaft 35 carries a third roller 37 which extends through a slot in the top of the table 4 and forms with the roller 18 and bevel surface 31 a pass similar to the bead in cross section. To the rear surface of the roller 37 is secured a bevel gear 38 which meshes with a bevel gear 39 carried on the under side of the roller 18. The surfaces of the rollers 18 and 37 may be roughened in any suitable manner to enable them to positively drive the bead 5 through the machine. It will be noted that the roller 30 is rotatable independently of the other two rollers 18 and 37, whereby it can rotate at a different speed to accommodate the machine to the different circumferences of the bead surface.

Secured to the rod 27 immediately in front of the cross piece 28 is the lower part of the stem 40 which extends upwardly through a slot in the arch-table 4 and carries at its upper end a frusto-conical roller 41. Behind the bridge piece 28 and surrounding the rod 27 is a coil spring 42 held in a state of compression by a collar 43 on rod 27. By this spring construction it will be seen that the roller 41 is enabled to give slightly whenever a splice passes the machine.

Having thus described the machine, a few words will suffice to make clear its operation. the operator draws a piece of bias fabric which has been given a coating of rubber, from a suitable roll or other supply along the table 8, through the guide trough 9', which is so positioned relative to the rollers to cause the edges of the fabric to overlap in the proper relation, over the rollers 10 and 11 on top of the shelf 13 and under the guiding fingers 14 and 16. He then places his foot on the treadle 26, moving the rod 21 from the right to the left as shown in Fig. 3. By this means the bridge piece 28 moves the roller 30 away from the roller 18, and the roller 41 away from the horn 17 to a sufficient distance to enable the operator to place the circular bead between these instrumentalities. The treadle is now released and the operator rotates the shaft 35, moving the rollers 18 and 37, which advance the tire bead through the machine. This tire bead has been previously prepared in a suitable tacky condition. The fabric is drawn through the machine and between rollers 41 and the horn 17, which bends the fabric around the tire bead, the final compression and cementing action being performed by the rollers 30 and 18, the two edges of the fabric being firmly pressed together to form the web 45 by the vertical surfaces of the rollers. When the leading end of the covering has reached the shelf 13 the operator ceases to rotate the handle 36, severs the oncoming fabric directly underneath the leading end and then completes the covering of the bead by further rotation of the handle 36. A slight pressure of the treadle 26 will open up the forming rolls and the bead may be removed.

It is obvious that changes and modifications may be made, altering the machine in detail, but I do not intend to be limited to such details, as alterations and modifications may be made without departing from the spirit of the invention or sacrificing any of its benefits.

I claim:

1. In a machine for operating upon circular tire beads, a fabric supply, means for guiding and holding the bead so that a portion thereof is within the fabric, fabric shaping and applying devices adjacent the portion of the bead within the fabric, yielding means to hold the devices against the bead and lever mechanism connected to said applying devices and acting against said yielding means to open up the devices permitting removal of the bead.

2. In a machine for covering circular bead material of triangular cross section, fabric guiding and flattening devices, a plurality of bead covering rollers, each roller contacting one side of the bead, a movable mounting for one of said rollers, a resilient element for holding the mounting in operative position and a means for moving it transversely of the bead material.

3. In a machine for covering triangular bead material, fabric guiding and flattening devices, a bead covering roller arranged at each side of said bead material, the axis of one of said rollers being movably mounted means for moving the said roller axis, and rotating driving connections for two of said rollers, the third roller being rotatable independently of the two said rollers.

4. A machine for covering beads, comprising a fabric supply, a fabric guiding horn and applying roller at one side of the bead, two fabric shaping and applying rollers at the other side of said bead, and means to move one pair of said shaping and applying members laterally to permit the insertion of the bead.

5. A machine for covering tire beads, comprising means for supporting the bead, a fabric supply and rollers for applying the fabric to the bead, one of said rollers being shaped to conform to one side of said bead and having its surface extended above said bead, and another of said rollers having one surface to correspond to another side of said bead, and having a second surface parallel to the surface of said first-named roller, and separable therefrom a distance to form a web on said bead.

6. A machine for covering tire beads, comprising means for supporting the bead, a fabric guiding and directing trough of width greater than the periphery of the cross section of the bead, rollers for applying the fabric to the bead, one of said rollers being shaped to conform to one side of said bead and having its surface extended above said bead, and another of said rollers having one surface to correspond to another side of said bead and having a second surface parallel to the surface of said first-named roller and separable therefrom a distance to form a web from the excess width of the fabric.

7. In a machine for covering bead material, a plurality of bead rolling elements arranged in triangular relation about the bead, and resilient mountings associated with said elements to permit them to spread in passing a splice.

8. A machine for covering bead material, a fabric supply, a plurality of bead covering rollers, the surfaces whereof are arranged in substantially triangular formation, and a resilient mounting for one of said rollers permitting it to move in two angular directions.

9. In a machine for rolling bead material, a plurality of rollers, the surfaces whereof are arranged in substantially triangular formation, a resilient mounting for one of said rollers permitting it to move in two angular directions, and means to open said rollers to admit the bead material.

10. A machine for rolling tire beads of triangular cross section, the combination of a pair of rollers having their axes disposed at an angle, for forming two sides of a tire bead, a third independently rotatable roller for forming the third side of the bead, and means for positively rotating one or more of said rollers.

11. A machine for rolling tire beads of triangular cross section, the combination of a pair of rollers mounted to rotate in planes at an angle to each other and having peripheries forming two sides of a work receiving space, and a third roller adapted to rotate at a different angular speed from the said rollers, the periphery of the last said roller forming the third side of the work receiving space.

12. A machine for rolling beads of triangular cross section, the combination of a pair of rollers geared together and rotating in different planes, their peripheries forming two sides of a triangular work receiving space, a third roller whose periphery forms the third side of said space, the said third roller being freely rotatable.

13. In a bead rolling machine, the combination of three rollers whose peripheries embrace a work receiving space, one of said rollers being adjustable relatively to the other rollers for opening and closing the space to admit and release the endless bead ring.

14. In a bead rolling machine, the combination of two rollers, the axes of which are angularly arranged with respect to one another, the surfaces of said rollers forming two sides of the work receiving space, gearing interconnecting said rollers, and a third roller mounted to rotate independently of the aforesaid rollers, and means to move one of said rollers to open the work receiving space.

15. A machine for operating upon tire beads of triangular cross section, the combination of a pair of rollers having their axes disposed at an angle, the surface of the said rollers conforming to two sides of the tire bead, a third roller conforming to the third side of the bead and mounted to be independently rotatable of the other rollers, and means for opening up the space formed by the said rollers to admit the bead material.

EDWARD D. PUTT.